United States Patent
Stenz

(10) Patent No.: US 7,512,922 B1
(45) Date of Patent: Mar. 31, 2009

(54) METHODS OF STRUCTURED PLACEMENT OF A CIRCUIT DESIGN

(75) Inventor: Guenter Stenz, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 152 days.

(21) Appl. No.: 11/787,812

(22) Filed: Apr. 18, 2007

(51) Int. Cl.
 *G06F 17/50* (2006.01)
(52) U.S. Cl. .................... 716/9; 716/10; 716/17
(58) Field of Classification Search ............ None
 See application file for complete search history.

(56) References Cited

U.S. PATENT DOCUMENTS

| 5,218,551 | A | * | 6/1993 | Agrawal et al. | 716/10 |
| 5,475,607 | A | * | 12/1995 | Apte et al. | 716/10 |
| 5,793,644 | A | * | 8/1998 | Koford et al. | 716/2 |
| 2007/0220470 | A1 | * | 9/2007 | Meyyappan et al. | 716/10 |

OTHER PUBLICATIONS

Jon Frankle; "Iterative and Adaptive Slack Allocation for Performance-driven Layout and FPGA Routing"; Copyright 1992 IEEE; 29th ACM/IEEE Design Automation Conference; Paper 34.1; pp. 536-542.

* cited by examiner

*Primary Examiner*—Leigh Marie Garbowski
(74) *Attorney, Agent, or Firm*—Kevin T. Cuenot; Lois D. Cartier

(57) ABSTRACT

A method of creating relatively placed macros (RPMS) for a circuit design for a target device can include determining N best configurations for each of a plurality of connections of the circuit design, wherein each configuration specifies relative positioning of a source and a load of a connection and an estimated delay for the connection. The method can include calculating a maximum allowable delay for each of the plurality of connections of the circuit design and determining that a connection selected from the plurality of connections is critical according to the N best configurations associated with the critical connection and the maximum delay of the critical connection. A configuration from the N best configurations associated with the critical connection can be selected. An RPM for the critical connection can be generated using the selected configuration.

20 Claims, 3 Drawing Sheets

METHODS OF STRUCTURED PLACEMENT OF A CIRCUIT DESIGN

FIELD OF THE INVENTION

The embodiments disclosed herein relate to the field of Electronic Design Automation and, more particularly, to placing time critical connections of a circuit design.

BACKGROUND

Electronic circuit designs can be constructed, simulated, debugged, and translated into electronic hardware using software-based implementation tools. An implementation tool, such as a High Level Modeling System (HLMS), can provide blocks that can be combined to build an electronic circuit. A block, also called a module, refers to a high level software construct that represents a particular circuit function, such as multiplexing, addition, multiplication, or the like. Blocks may have ports that can produce and consume signals, and may be arranged within the implementation tool to form a circuit and/or system. Communication among the blocks can be represented by wires, or signals, that graphically link the blocks.

The circuit design may be simulated within the implementation tool once it is constructed. Some implementation tools can generate a hardware implementation from the block representation of the circuit design. For example, an implementation tool may generate the bitstream necessary to program a programmable logic device (PLD) or generate the hardware description language (HDL) files necessary to specify the hardware design.

One example of an HLMS is System Generator for DSP™, available from Xilinx, Inc. of San Jose, Calif. System Generator for DSP™ is a system level modeling tool that facilitates field programmable gate array (FPGA) hardware design. System Generator for DSP™ provides a wide range of blocks that can be automatically compiled into a design suitable for an FPGA. Among these blocks are high level abstractions that implement complex functions, including digital signal processing as well as communication and control logic. In addition, access to underlying FPGA resources can be provided through low level block abstractions that facilitate the construction of highly efficient FPGA designs. (Xilinx and System Generator for DSP are trademarks of Xilinx, Inc. in the United States, other countries, or both).

An FPGA is one variety of PLD that typically includes an array of functional elements such as configurable logic blocks (CLBs), which may be surrounded by a ring of programmable input/output blocks (IOBs). The CLBs and IOBs are interconnected by a programmable interconnect structure. The CLBs, IOBs, and interconnect structure can be programmed by loading a stream of configuration data, referred to as a bitstream, into internal configuration memory cells that define how the CLBs, IOBs, and interconnect structure are configured. An FPGA may also include various other functional elements such as memories, microprocessors, digital clock managers (DCMs), input/output (I/O) transceivers, and the like.

In order to implement a design on an FPGA, the design, which typically is specified using an HDL, must be mapped onto the available functional elements of the FPGA device. That is, the circuit design elements, such as logic gates and the like, must be mapped onto the functional elements, e.g., lookup-tables (LUTs), CLBs, flip-flops, block random access memories (BRAMs), IOBs, and the like, available on the physical FPGA device within which the circuit design will be implemented. Once the elements of the circuit design are mapped to functional elements, the circuit design must be placed. Placement refers to the process of assigning a site, or physical location on the FPGA, to each element of the circuit design. After placement, the circuit design can be routed. A bitstream then can be generated which, when loaded into the PLD, implements the circuit design within the device.

The above processes can be performed by an implementation tool such as an HLMS. With respect to placement, for example, a placement algorithm can be executed by the implementation tool that assigns locations to the elements of the circuit design based upon various factors such as timing constraints and the particular functional element of the FPGA to which each design element is mapped. Most implementation tools utilize a placement algorithm that relies upon a global cost function. The global cost function seeks to minimize the wire lengths and delays across all connections of the circuit design. In other words, the implementation tool evaluates placement of circuit components by applying a cost function to the circuit design as a whole, not with a view toward any individual connection.

There are cases, however, in which global placement techniques are ineffective. In those cases, a select group of connections may require special handling. For example, the connection between a BRAM and a flip flop may require a very small delay. A conventional implementation tool may determine a placement for the BRAM and flip flop that does not meet the needed timing requirements for that connection. In that case, the critical connection fails timing requirements. There may be only a very limited number of placement configurations, or even a single one, for the BRAM and flip flop that meets the timing requirement. A placement algorithm that is guided by a global cost function may not find this placement for a specific connection. In such cases, it becomes necessary for the designer to intervene by creating a relatively placed macro (RPM).

An RPM refers to a grouping of two or more circuit primitives which have been associated with location constraints. The location constraints define relative coordinates among the various members of the RPM, thereby allowing the RPM to be treated as a single, larger component. The constraints can be specific or more generalized. For example, an RPM may specify that a circuit element "A" and a circuit element "B" must be located within the same slice of a CLB, or at particular sites of the same CLB, to ensure that a timing requirement between elements "A" and "B" is met. In another example, an RPM can specify that another circuit element "C" must be placed in a column of the FPGA that is adjacent to the column within which elements "A" and "B" are placed.

The implementation tools abide by the constraints imposed by RPMs when placing a circuit design. RPMs, however, must be manually created by a circuit designer, typically in response to a placement that does not address the timing needs of one or more specific connections of the circuit design.

SUMMARY

The present invention relates to the automatic creation of relatively placed macros (RPMs). One embodiment of the present invention can include a computer-implemented method of creating RPMs for a circuit design for a target device. The method can include determining N best configurations (i.e., a number N of configurations deemed "best" by some predetermined criteria) for each of a plurality of connections of the circuit design, wherein each configuration specifies relative positioning of a source and a load of a connection and an estimated delay for the connection. The method can include calculating a maximum allowable delay for each of the plurality of connections and determining that a selected connection from the plurality of connections is critical according to the N best configurations associated with the selected connection and the maximum allowable delay of the selected connection. A configuration from the N best configurations associated with the critical connection can be selected. An RPM for the critical connection can be generated using the selected configuration. The RPM can then be output, for example, by storing the RPM in a computer file, providing the RPM to a user, or passing the RPM to other software such as implementation tools for the target device.

Selecting a configuration from the N best configurations can include selecting a configuration from the N best configurations associated with the selected connection having an estimated delay that is less than the maximum allowable delay for the selected connection, selecting a configuration from the N best configurations that has a smallest delay, and/or selecting a configuration from the N best configurations according to a restriction requirement associated with at least one of a source or a load of the selected connection.

Determining that a selected connection from the plurality of connections is critical can include calculating a measure of criticality for the selected connection. For example, a determination can be made as to whether a quantity that depends upon the estimated delay of the selected connection, as specified by a configuration associated with the selected connection that has a lowest estimated delay, is greater than the maximum allowable delay for the selected connection. In another embodiment, the plurality of connections of the circuit design can be sorted according the measure of criticality associated with each of the plurality of connections. Determining that a selected connection from the plurality of connections is critical also can include identifying the selected connection as critical if a quantity that depends upon the estimated delay of the selected connection, as specified by a configuration associated with the selected connection having a lowest estimated delay, exceeds a predetermined percentage of the maximum allowable delay of the selected connection.

Another embodiment of the present invention can include a computer-implemented method of creating RPMs for a circuit design for a target device including determining at least one configuration associated with each of a plurality of connections of the circuit design, wherein each configuration specifies relative locations for a source and a load of a connection and an estimated delay for the connection, and calculating a maximum allowable delay for each of the plurality of connections. The method can include identifying each connection from the plurality of connections having a ratio of a quantity that is dependent upon estimated best delay to maximum allowable delay that exceeds a predetermined value as a critical connection and updating the circuit design with constraint information forcing a source and a load of each critical connection to be placed according to the relative locations specified by the configuration associated with that critical connection. The updated circuit design can then be stored, for example, as a computer file.

Each of the plurality of connections can specify a resource type of the source and a resource type of the load. Each configuration for a connection can include a suitable site for the source and a suitable site for the load. Determining at least one configuration for each of the plurality of connections can include determining N best configurations for each connection signature, where each connection of the plurality of connections has a connection signature. In another embodiment, from the N best configurations associated with a selected connection, a configuration that specifies relative positioning of a source and a load that conforms to a restriction requirement associated with at least one of a source or a load of the selected connection can be selected.

Yet another embodiment of the present invention can include a computer program product including a computer-usable medium having computer-usable program code that, when executed by an information processing system, causes the information processing system to perform the various steps and/or functions disclosed herein.

DETAILED DESCRIPTION OF THE DRAWINGS

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed herein relate to automatically creating relatively placed macros (RPMs) for a circuit design to be implemented using a programmable logic device (PLD). For example, the embodiments of the present invention can be applied to circuit designs to be implemented in field programmable gate array (FPGA) type PLDs, application specific integrated circuits (ASICs), or other design styles and/or devices. Once a circuit design is mapped for a given target device, critical connections of the design can be identified. An RPM can be automatically generated for each critical connection using a library of configurations for the various connections of the circuit design.

Figure 1:
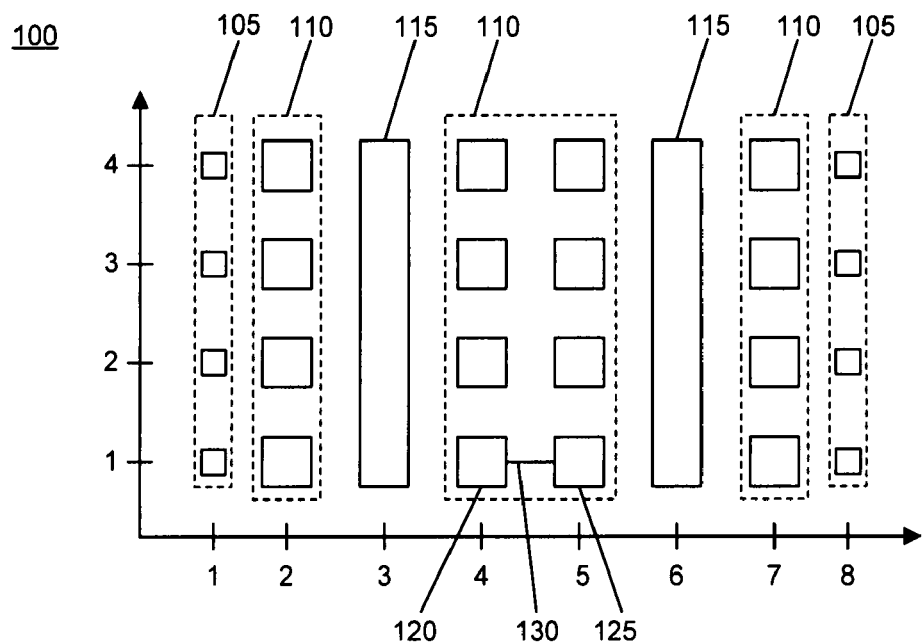
FIG. 1 is a block diagram of a target device illustrating a technique for characterizing connections of a circuit design in accordance with one embodiment of the present invention.

FIG. 1 is a block diagram of a target device 100. As noted above, the target device can be a PLD, an ASIC, or another variety of device for which RPMs can be used. FIG. 1 illustrates one aspect of characterizing connections of a circuit design in accordance with one embodiment of the present invention. The target device 100, for example, an FPGA, is provided for purposes of illustration only. As such, it should be appreciated that a target device, such as an FPGA, can include many more functional elements as well as different varieties of functional elements beyond those illustrated in FIG. 1.

The target device 100 includes a variety of input/output blocks (IOBs) 105, configurable logic blocks (CLBs) 110, and block random access memories (BRAMs) 115. As shown, the target device 100 is superimposed over a grid-based coordinate system such that each functional element can be assigned a coordinate location in terms of the x-axis and the y-axis. For example, the coordinates of CLB 120 can be (4,1). The coordinates of CLB 125 can be (5,1).

To implement a circuit design, the circuit elements of the circuit design must be mapped onto the functional elements available on the target device. Once the circuit design is mapped, the circuit design can be placed. Placement refers to the process of assigning a site, or location, on the target device 100 to each circuit element of the circuit design, taking into account the particular functional element to which each circuit element is mapped.

For purposes of illustration, consider the case where the mapped circuit design results in a connection 130 between a source circuit element within CLB 120 and a load circuit element within CLB 125. The delay of connection 130 can be characterized, in part, in terms of the horizontal distance and the vertical distance between the locations of CLBs 120 and 125 on target device 100. In other words, connection 130 can be characterized, in part, according to dx=x(load)−x(source) and dy=y(load)−y(source). In determining dx and dy, the coordinates of the CLBs including the source circuit element and the load circuit element can be used. For example, using CLB 120 as the source and CLB 125 as the load, the equations can be rewritten as dx=5−4=1 and dy=1−1=0.

Figure 2:
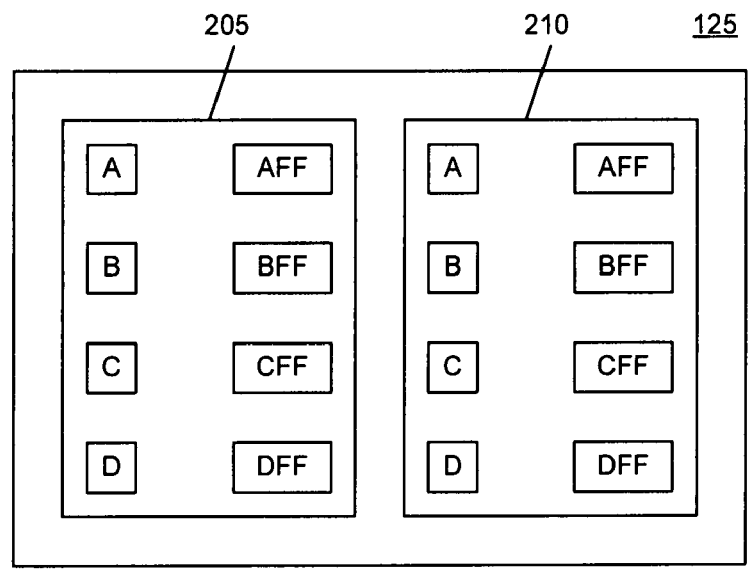
FIG. 2 is a block diagram of a configurable logic block (CLB) of a target device illustrating a technique for characterizing connections of a circuit design in accordance with another embodiment of the present invention.

FIG. 2 is a block diagram of CLB 125 of target device 100. FIG. 2 illustrates an aspect of characterizing connections of a circuit design in accordance with another embodiment of the present invention. A connection of a circuit design further can be characterized in terms of the resource type, e.g., lookup table (LUT), flip-flop, etc., of the source and the resource type of the load. The CLB 125 can include two slices 205 and 210. Each slice 205 and 210 can include four LUTs A, B, C, and D, (sites) as well as four flip-flops AFF, BFF, CFF, and DFF (sites). It should be appreciated that the CLB 125 is shown for purposes of illustration only and that the embodiments disclosed herein can be applied in cases where other varieties or structures of CLBs or other functional elements of a target device are used.

Consider the case where the circuit design specifies a connection between a flip-flop and a BRAM which requires a small delay. It may be the case that only a few relative placements for the source and load, or possibly a single relative placement, on the target device will achieve the desired delay for the connection. The flip-flop may need to be placed at BFF of a slice and the BRAM may need to be placed 2 units to the left of the slice. For example, the flip-flop may be placed in site BFF of slice 205 of CLB 125 and the BRAM into the site located at x=3 as shown in FIG. 1. A conventional placer will not likely find that particular placement solution for the connection. In consequence, a circuit designer would have to manually specify the connection in the form of an RPM.

The delay of two connections having the same dx, dy, as well as the same source and load resource types can be considered to be approximately equal, if not the same, across the target device 100. This is due to the grid-like nature of a target device such as an FPGA, where functional elements such as CLBs are arranged in columns and rows. Similar characteristics can be found in other design styles, for example, ASICs. With this in mind, a "configuration" for a connection can be defined by the set of parameters dx, dy, resource type of source, resource type of load, and the associated delay of the connection. A "signature" of a connection can be characterized in terms of the type of source and load of the connection as well as any restrictions as to locations, or sites, on the target device 100 where a source and/or load can be placed. Two connections having the same signature will share the same configurations.

Figure 3:
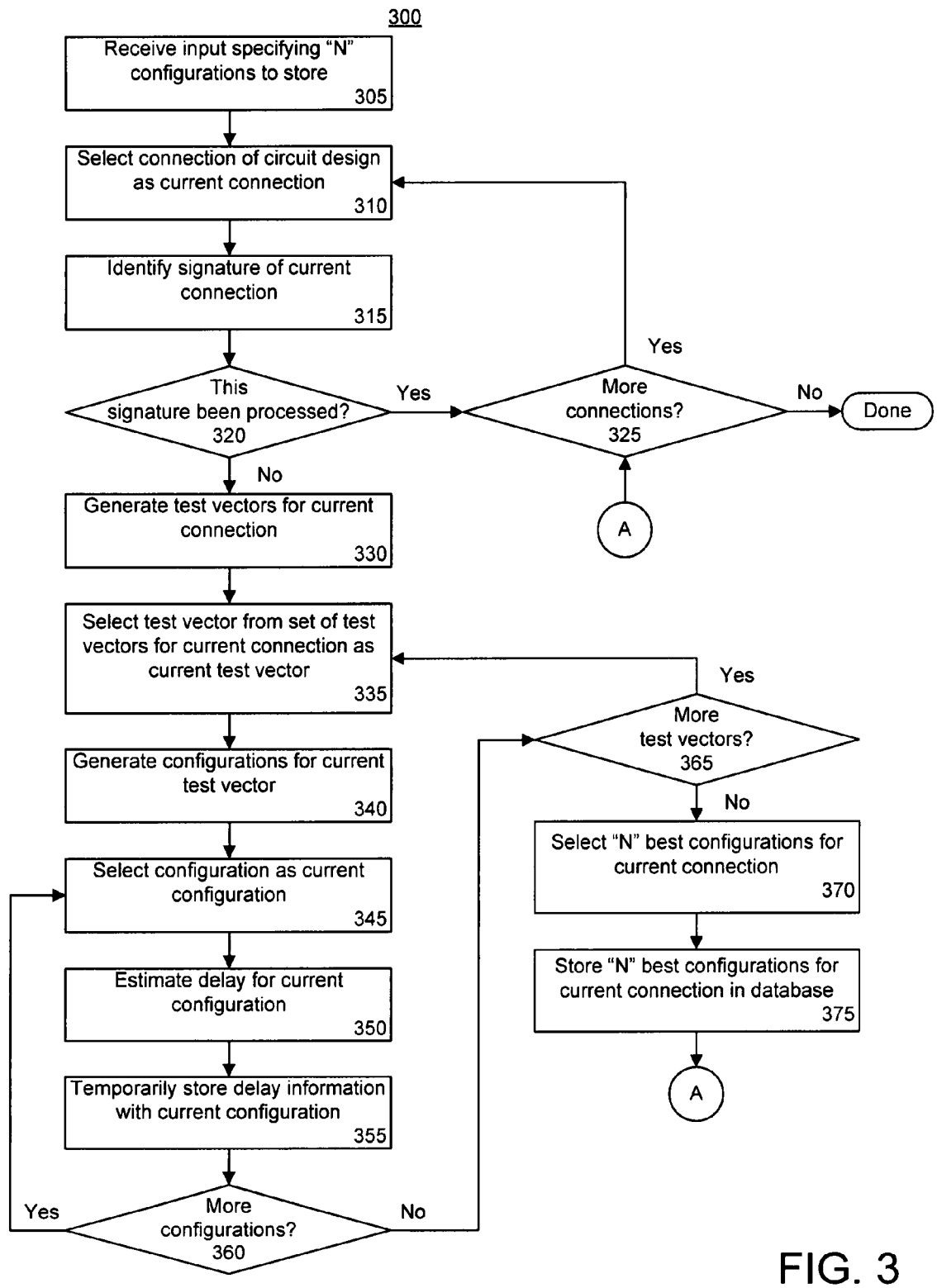
FIG. 3 is a flow chart illustrating a method of generating configuration information for connections of a circuit design in accordance with another embodiment of the present invention.

FIG. 3 is a flow chart illustrating a method 300 of generating configuration information for connections of a circuit design in accordance with another embodiment of the present invention. The method 300 can be implemented using an implementation tool such as a High Level Modeling System (HLMS). The method 300 can begin in a state where a circuit design has been loaded into the implementation tool. The circuit design can be mapped, such that the various elements of the circuit design have been associated with, or assigned to, available functional elements and specific resource types of the target device, e.g., gates have been mapped to LUTs and/or flip-flops of CLBs, etc. The circuit design, however, has not been placed. That is, although the elements of the circuit design have been associated with physical structures of the target device, those circuit elements have not yet been assigned to locations, or sites, on the physical device.

Accordingly, the method 300 can begin in step 305, where an input can be received that specifies the number "N" configurations to generate for each connection signature of the circuit design, e.g., the N best configurations with respect to estimated delay. The parameter "N" can be specified by a user as a global parameter for the implementation tool or for the particular circuit design being processed, for example. In step 310, a connection of the circuit design can be selected as the current connection. In step 315, the signature of the connection can be identified. As noted, a connection signature can indicate the type of source and load of the connection as well as any restrictions as to locations, or sites, on the target device where a source and/or load can be placed.

In step 320, a determination can be made as to whether another connection of the circuit design having the same signature as the current connection has already been processed. If so, the method can proceed to step 325. If not, the method can proceed to step 330 to continue processing the current connection. In step 325, a determination can be made as to whether further connections of the circuit design are to be processed. If so, the method can loop back to step 310 to continue processing further connections. If not, the method can end. It should be appreciated that since two connections having the same signature will share the same configurations, it is not necessary to process a connection that has the same signature as another previously processed connection.

Continuing with step 330, one or more test vectors can be generated for the current connection. A test vector indicates a pair of coordinate locations on the target device for the selected connection. The pair of locations can include a site that is a valid site for the source, given the resource type of the source, as well as a site that is a valid site for the load, given the resource type of the load. Each test vector indicates a dx and dy parameter for a pair of functional elements of the target device, as determined from the coordinate system superimposed on the target device. The test vector, however, while indicating potential sites through reference to a coordinate location (e.g., a CLB), does not indicate particular sites within such function elements (e.g., a particular LUT site or flip flop site).

For example, if the current connection specifies a LUT source connected to a flip flop load, a CLB having a suitable site for locating the LUT can be selected. A test vector of (1,0)

indicates that the dx of between the source and load is 1 and the dy between the source and load is 0. In illustration, the load of the connection is to be located within a functional element, e.g., a CLB, that is one column (or unit) to the right of the functional element that includes the source. The functional element including the source will be in the same row as the functional element including the load.

Because the configurations that will be generated for a given connection are to be used for critical connections, the range of possible test vectors can be limited. The expected delay of a connection, as noted, can be characterized, at least in part, in terms of the dx and dy of the source site and the load site. Accordingly, the implementation tool can be constrained in terms of the maximum allowable offset between the source site and the load site for each test vector to ensure that configurations resulting in low delays are determined. This also relieves the implementation tool from creating test vectors with a distance between the source and load that will have little or no chance of meeting the delay requirements for the connection. For example, if the implementation tool is constrained to generate test vectors with a maximum of dx=|1| and dy=|1|, the test vectors (−1,−1), (−1,0), (0,1) (0,−1), (0,0), (0,1), (1,−1), (1,0), (1,1) can be generated. It should be appreciated that quantities such as dx and dy can be expressed in terms of absolute magnitude or as positive integers or negative integers to indicate directional relation between the load and source.

Accordingly, a constraint can be applied during the generation of test vectors that limits the distance between the source site and the load site specified by each test vector such that the distance does not exceed some defined threshold. If the distance indicated by the test vector is below this threshold, the delay for that configuration likely will be low, or among the lowest delays attainable for the particular target device.

In step 335, a test vector from the set of test vectors generated can be selected as the current test vector. In step 340, one or more configurations can be generated for the current test vector. While the test vectors are limited to the coordinate locations described herein, the configurations can indicate the particular location, or site, within a functional element in which a source and/or load can be located. For example, consider a LUT source being connected to a flip flop load. The configuration for a test vector of (1,0) can indicate more specific information such as (1, 0, Slice0:LUTA, Slice1: BFF). In this example, the configuration specifies a dx and dy of 1 and 0 respectively. Thus, the CLB including the load will be one unit to the right of the CLB including the source. The configuration further specifies that the LUT will be located at a site within slice 0 at LUT A of the source CLB. The flip flop will be located at the site within slice 1 at BFF of the load CLB.

All possible configurations for a given test vector can be determined based upon the resource types. That is, the configurations can specify that the LUT source can be located at any of the available LUT sites of a CLB that matches the test vector (1,0). Such configurations would allow the flip flop load to be located at any of the available flip flop sites of a CLB that matches the test vector, e.g., that has a dx=1 and a dy=0 with respect to the CLB in which the LUT source is located.

In step 345, a particular configuration from the set of configurations generated in step 340 can be selected as the current configuration. In step 350, a delay can be estimated for the current configuration. The delay can be estimated using a standard estimation technique, particularly as quantities such as the type of resource, e.g., circuit component, of the source and load of the connection, the distance between the source and load of the connection as specified by the test vector, and the available wiring resources that would be used to connect the source and load are known. Such delay estimation techniques are known in the art.

In step 355, the delay information determined for the current configuration can be temporarily stored with the configuration. Continuing with the prior example where the configuration was specified as (1, 0, Slice0:LUTA, Slice1:BFF), the configuration can be updated and stored as (1, 0, Slice0: LUTA, Slice1:BFF, 150). The value of 150 added to the configuration indicates the delay, which in this case is 150 picoseconds.

In step 360, a determination can be made as to whether further configurations remain to be processed for the current test vector. If so, the method can loop back to step 345 to continue processing. If not, the method can proceed to step 365. In step 365, a determination can be made as to whether further test vectors remain to be processed for the current connection. If so, the method can loop back to step 335 to continue processing. If not, the method can proceed to step 370, where the "N" best configurations for the current connection can be identified. The N best configurations can be the N configurations with the lowest estimated delay, for example. For example, the 2, 3, 4, or 5 (or some other integer) configurations for the current connection having the lowest estimated delay can be identified as the N best configurations. In step 375, the "N" best configurations for the current connection can be stored or added to the configuration database or other data structure for later use. Each configuration stored in the configuration database can be associated with the signature of the connection for which those configurations were determined. Accordingly, configurations can be looked up from the configuration database for any connection according to the signature of that connection.

After step 375, the method can loop back to step 325 to determine whether further connections remain to be processed.

It should be appreciated that due to the grid-like nature of a target device, and particularly an FPGA, the test vector, and thus the configurations that are generated, can be viewed as a template. That is, once a configuration is determined, that configuration can be "moved" over the target device and coordinate system until the configuration fits, or matches, other potential source and load site combinations.

In other words, given the redundant nature of circuit elements such as CLBs on an FPGA, being arranged in columns and rows, a configuration, once determined, can refer to a relative placement of two components. The configuration may refer to a plurality of source site and load site pairs that have the same distance as the test vector and which are suitable for the same source and load resource types. In that sense, though a connection may be associated with a particular configuration, that connection (and configuration), may be implemented at more than one physical location on the target device.

Figure 4:
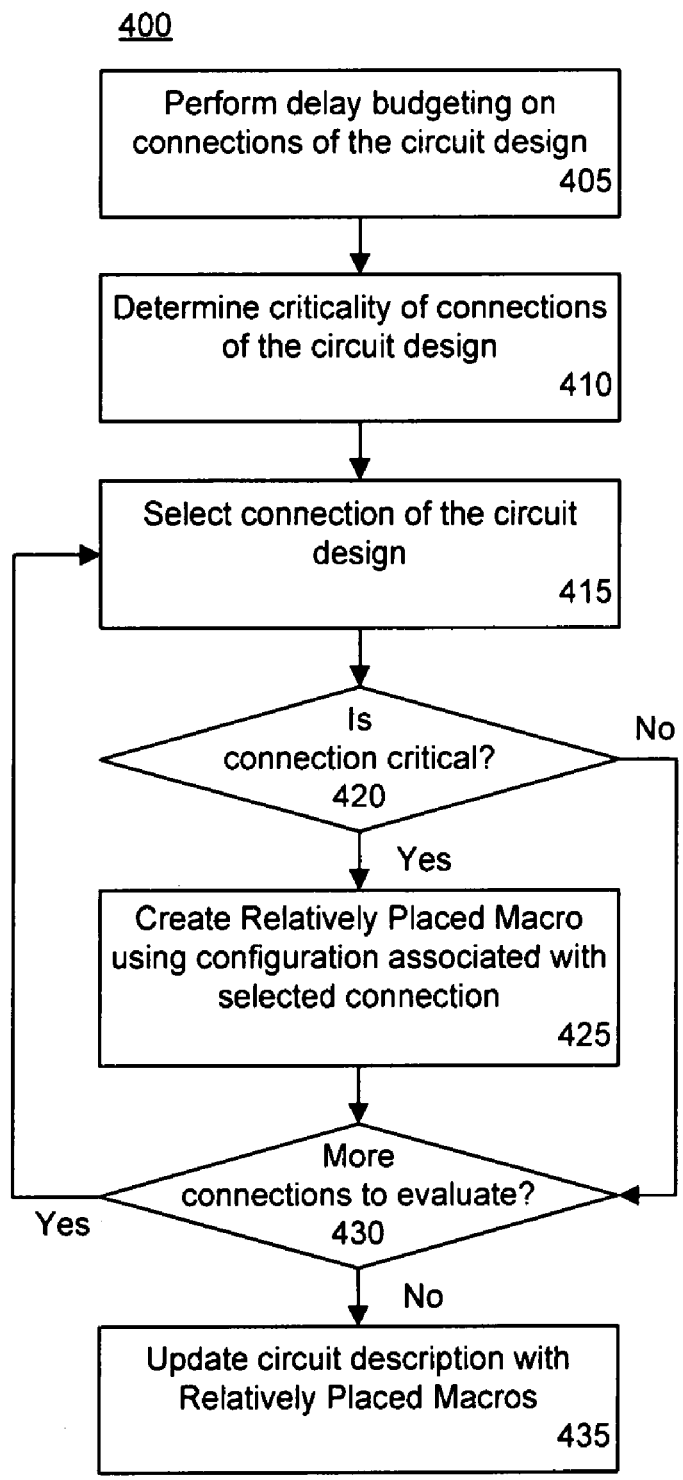
FIG. 4 is a flow chart illustrating a method of automatically creating relatively placed macros (RPMs) in accordance with yet another embodiment of the present invention.

FIG. 4 is a flow chart illustrating a method 400 of automatically creating a relatively placed macro (RPM) in accordance with another embodiment of the present invention. The method 400 can begin in a state where the database of connection configurations has been generated for a circuit design as described with reference to FIG. 3. Further, the circuit design can be in a state that is mapped for implementation on a particular target device as noted.

Accordingly, the method 400 can begin in step 405 where delay budgeting for the circuit design can be performed. Delay budgeting refers to the process of determining upper bounds for net delays and/or connections to guide timing-driven placement. In general, delay budgeting can compute a maximum allowable delay for each connection of a circuit design that, if met, ensures that the overall timing requirements of the circuit design will be met. That is, if each individual connection has a delay that is less than the maximum allowable delay determined through a delay budgeting process, an implementation tool will determine that the circuit design will meet the overall timing requirements established for the circuit design. In other words, a maximum allowable delay for a connection is a delay value that guarantees timing success for the circuit design specification.

Any of a variety of techniques for performing delay budgeting known to the skilled artisan can be used. As such, the present invention is not intended to be limited by the particular delay budgeting technique and/or process used. Still, in one embodiment, delay budgeting can be performed according to the techniques described in Frankle, "Iterative and Adaptive Slack Allocation for Performance-driven Layout and FPGA Routing", $29^{th}$ ACM/IEEE Design Automation Conference (1992), which is fully incorporated herein by reference.

In step 410, the criticality of the connections of the circuit design can be determined. In one embodiment, the criticality of a connection can be determined through a comparison of the maximum allowable delay for that connection with the "best", or lowest, delay for that connection. The "best" delay for a connection can be determined from the configuration database generated as described in FIG. 3. For example, for a selected connection, the configurations associated with that connection, e.g., the "N" best configurations, can be determined by locating the configurations from the configuration database that have the same connection signature as the selected connection. In one embodiment, the configurations associated with the selected connection can be evaluated to identify the configuration having the lowest delay. This delay can be selected as the "best" delay. It should be appreciated, however, that any of the "N" best configurations for a connection can be selected as offering or having the "best" delay. Such a selection can depend upon other circuit constraints and conditions, e.g., congestion or the like. If the maximum delay for a connection is less than the best delay for that connection multiplied by a delay factor, the connection can be considered critical. Thus, for a given connection "c", that connection will be considered critical if Max_Delay(c) <Best_Delay(c)*Delay_Factor.

In one embodiment, the delay factor can be set to a value of 1.25. It should be appreciated, however, that the value of the delay factor can vary according to many factors including, but not limited to, the complexity of the circuit design, the number of available configurations for connections of the circuit design, and/or the physical attributes or layout of the target device. Further, the delay factor can be adjusted from empirical data. As such, the value of 1.25 is provided to illustrate one possible value of the delay factor, but is not intended to limit the present invention solely to using such a value. For example, other values such as 1.20, 1.10, 1.15, 1.30, other values between those listed, or above or below those listed may be used.

In step 415, a connection of the circuit design can be selected as the current connection. In step 420, a determination can be made as to whether the current connection is critical. If not, the method can continue to step 430. If the current connection is determined to be critical, an RPM can be created for the current connection in step 425. A configuration can be located within the configuration database for the current connection according to the signature type of the current connection. That is, any configurations associated with, or having, a signature that is the same as the current connection can be located. A configuration from those located for the current connection that has a delay that is less than or equal to the maximum delay for the current connection can be selected and assigned to the current connection. In one embodiment, the configuration assigned to the current connection can be the configuration having the lowest delay. In another embodiment, the configuration that is assigned to the current connection can be any of the configurations that has a delay that is less than, or equal to, the maximum delay for the current connection. Still, in another embodiment, if the connection is subject to any placement constraints, such as having to place a LUT into a particular slice of a CLB or into a particular LUT location of a slice, a configuration can be selected that conforms to such a constraint.

In another embodiment, the degree of criticality of a connection can influence the particular configuration that is selected. For example, if connection "B" is considered to have a high degree of criticality, the configuration selected for creating an RPM for connection "B" can have a lower, or lowest delay, of the available configurations for connection "B". Similarly, if connection "B" is critical, but to a lesser degree when compared with other critical connections of the circuit design, the configuration that is selected can have a delay that is not the lowest possible delay of all of the configurations associated with connection "B". In any case, the connection can be associated with the selected configuration and stored as an RPM to be used and interpreted during placement.

In step 430, a determination can be made as to whether further connections of the circuit design remain to be processed. If so, the method can loop back to step 415 to select another connection as the current connection for evaluation. If not, the method can proceed to step 435 where the circuit description can be updated with the RPM(s) that were automatically created as described herein. The resulting circuit description can be stored or processed further, e.g., placed in such a way that the RPM(s) are implemented. As known, after placement, the circuit design can be routed and a bitstream can be generated that, when loaded into the target device, instantiates the circuit design within the target device.

The flowcharts in the figures illustrate the architecture, functionality, and operation of possible implementations of systems, methods and computer program products according to various embodiments of the present invention. In this regard, each block in the flowcharts may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. In another example, the connections can be sorted according to criticality prior to selection. Alternatively, the criticality of a connection can be calculated after selection, e.g., step 415. It also should be noted that each block of the flowchart illustrations, and combinations of blocks in the flowchart illustrations, can be implemented by special purpose hardware-based systems that perform the specified functions or acts, or combinations of special purpose hardware and computer instructions.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, computer memory, or the like.

The terms "computer program", "software", "application", "computer-usable program code", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising, i.e., open language. The term "coupled", as used herein, is defined as connected, although not necessarily directly, and not necessarily mechanically, e.g., communicatively linked through a communication channel or pathway or another component or system.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of creating a relatively placed macro for a circuit design for a target device, the method comprising:
   determining N best configurations for each of a plurality of connections of the circuit design, wherein each configuration specifies relative positioning for a source of a connection and a load for the connection and an estimated delay for the connection, wherein N is an integer;
   calculating a maximum allowable delay for each of the plurality of connections;
   determining that a selected connection from the plurality of connections is critical according to the N best configurations associated with the selected connection and the maximum allowable delay of the selected connection;
   selecting a configuration from the N best configurations associated with the critical connection;
   generating a relatively placed macro for the critical connection using the selected configuration; and
   outputting the relatively placed macro.

2. The method of claim 1, wherein selecting a configuration from the N best configurations comprises selecting a configuration from the N best configurations having a delay that does not exceed the maximum allowable delay.

3. The method of claim 1, wherein selecting a configuration from the N best configurations comprises selecting a configuration from the N best configurations having a smallest estimated delay.

4. The method of claim 1, wherein selecting a configuration from the N best configurations comprises selecting a configuration from the N best configurations according to a restriction requirement associated with at least one of a source or a load of the critical connection.

5. The method of claim 1, wherein determining that a selected connection from the plurality of connections is critical comprises calculating a measure of criticality for the selected connection.

6. The method of claim 5, wherein determining that a selected connection from the plurality of connections is critical further comprises determining whether a quantity that depends upon the estimated delay of the selected connection, as specified by a configuration associated with the selected connection having a lowest estimated delay, is greater than the maximum allowable delay for the selected connection.

7. The method of claim 5, wherein determining that a selected connection from the plurality of connections is critical further comprises sorting the connections of the circuit design according the measure of criticality associated with each of the plurality of connections.

8. The method of claim 1, wherein determining that a selected connection from the plurality of connections is critical comprises identifying the selected connection as critical if a quantity that depends upon the estimated delay of the selected connection, as specified by a configuration associated with the selected connection having a lowest estimated delay, exceeds a predetermined percentage of the maximum allowable delay of the selected connection.

9. A computer-implemented method of creating a relatively placed macro for a circuit design for a target device comprising:
   determining at least one configuration associated with each of a plurality of connections of the circuit design, wherein each configuration specifies relative locations for a source and a load of a connection and an estimated delay for the connection;
   calculating a maximum delay for each of the plurality of connections;
   identifying each connection from the plurality of connections having a ratio of a quantity dependent upon estimated best delay to maximum delay that exceeds a predetermined value as a critical connection;
   updating the circuit design with constraint information forcing a source and a load of each critical connection to be placed according to the relative locations specified by the configuration associated with that critical connection; and
   storing the updated circuit design, wherein the constraint information specifies the relatively placed macro.

10. The method of claim 9, wherein each of the plurality of connections comprises a resource type of the source and a resource type of the load, wherein each configuration for a connection comprises a suitable site for the source and a suitable site for the load.

11. The method of claim 9, wherein each of the plurality of connections has a connection signature, wherein determining at least one configuration associated with each of the plurality of connections comprises determining N best configurations for each connection signature, wherein N is an integer.

12. The method of claim 11, further comprising, from the N best configurations associated with a selected connection, selecting a configuration that specifies relative positioning of a source and a load that conforms to a restriction requirement associated with at least one of a source or a load of the selected connection.

13. A computer program product, comprising:
a computer-usable medium having computer-usable program code that creates a relatively placed macro for a circuit design for a target device, the medium comprising:
computer-usable program code that determines N best configurations for each of a plurality of connections of the circuit design, wherein each configuration specifies relative positioning for a source of a connection and a load for the connection and an estimated delay for the connection, wherein N is an integer;
computer-usable program code that calculates a maximum allowable delay for each of the plurality of connections;
computer-usable program code that determines that a selected connection of the plurality of connections is critical according to the N best configurations associated with the selected connection and the maximum allowable delay of the selected connection;
computer-usable program code that selects a configuration from the N best configurations associated with the critical connection;
computer-usable program code that generates a relatively placed macro for the critical connection using the selected configuration; and
computer-usable program code that outputs the relatively placed macro.

14. The computer program product of claim 13, wherein the computer-usable program code that selects a configuration from the N best configurations comprises computer-usable program code that selects a configuration from the N best configurations having a delay that does not exceed the maximum allowable delay.

15. The computer program product of claim 13, wherein the computer-usable program code that selects a configuration from the N best configurations comprises computer-usable program code that selects the configuration from the N best configurations having a smallest estimated delay.

16. The computer program product of claim 13, wherein the computer-usable program code that selects a configuration from the N best configurations comprises computer-usable program code that selects a configuration from the N best configurations according to a restriction requirement associated with at least one of a source or a load of the critical connection.

17. The computer program product of claim 13, wherein the computer-usable program code that determines that a selected connection from the plurality of connections is critical comprises computer-usable program code that calculates a measure of criticality for the selected connection of the circuit design.

18. The computer program product of claim 17, wherein the computer-usable program code that determines that a selected connection from the plurality of connections is critical further comprises computer-usable program code that compares a quantity that depends upon the estimated delay of the selected connection, as specified by a configuration associated with the selected connection having a lowest estimated delay, and the maximum allowable delay for the selected connection.

19. The computer program product of claim 17, wherein the computer-usable program code that determines that a selected connection from the plurality of connections is critical further comprises computer-usable program code that designates each connection having a measure of criticality that exceeds a threshold value as a critical connection.

20. The computer program product of claim 17, wherein the computer-usable program code that determines that a selected connection from the plurality of connections is critical further comprises computer-usable program code that identifies the selected connection as critical if a quantity that depends upon the estimated delay of the selected connection, as specified by a configuration associated with the selected connection having a lowest estimated delay, exceeds a predetermined percentage of the maximum allowable delay of the selected connection.

* * * * *